United States Patent
Tsai et al.

(10) Patent No.: US 7,450,658 B2
(45) Date of Patent: Nov. 11, 2008

(54) APPARATUS OF TRANSMITTER AND RECEIVER FOR MIMO MC-CDMA SYSTEM

(75) Inventors: Jiann-An Tsai, Jiadong Township, Pingtung County (TW); Shih-Kai Lee, Bali Township, Taipei County (TW); Chang-Lung Hsiao, Hsinchu (TW)

(73) Assignee: Industrial Technology Research Institute, Chutung, Hsinchu (TW)

( * ) Notice: Subject to any disclaimer, the term of this patent is extended or adjusted under 35 U.S.C. 154(b) by 0 days.

(21) Appl. No.: 11/882,483

(22) Filed: Aug. 2, 2007

(65) Prior Publication Data

US 2008/0037682 A1  Feb. 14, 2008

Related U.S. Application Data

(62) Division of application No. 10/868,804, filed on Jun. 17, 2004, now Pat. No. 7,330,513.

(30) Foreign Application Priority Data

Nov. 24, 2003  (TW) ............................. 92132943 A (51) Int. Cl.
*H04L 7/02* (2006.01)
(52) U.S. Cl. ................... 375/267; 375/260; 375/130; 375/295; 375/316; 455/203; 455/204; 455/210
(58) Field of Classification Search ............... 375/260, 375/130, 295, 316, 267; 455/203, 204, 210
See application file for complete search history.

(56) References Cited

U.S. PATENT DOCUMENTS

| | | | |
|---|---|---|---|
| 5,555,268 A | * | 9/1996 | Fattouche et al. ........... 375/141 |
| 6,400,750 B1 | | 6/2002 | Lee et al. |
| 6,542,485 B1 | | 4/2003 | Mujtaba |
| 2002/0168022 A1 | | 11/2002 | Kim |
| 2002/0172308 A1 | | 11/2002 | Harel et al. |
| 2002/0181607 A1 | | 12/2002 | Izumi |
| 2003/0026200 A1 | | 2/2003 | Fu et al. |
| 2005/0094740 A1 | * | 5/2005 | Borran et al. ............... 375/267 |

OTHER PUBLICATIONS

Le Nir, "Space-time block coding applied to turbo coded multicarrier CDMA", The 57th IEEE Semiannual Vehicular Technology Conference, 2003. VTC 2003-Spring, vol. 1, Apr. 22-25, 2003 pp. 577-581 vol. 1.*

(Continued)

*Primary Examiner*—Juan A Torres
(74) *Attorney, Agent, or Firm*—Bacon & Thomas, PLLC (57) ABSTRACT

At the transmitter of a transmitter and receiver apparatus for Multiple Input/Multiple Output MultiCarrier-Code Division Multiple Access (MIMO MC-CDMA) systems, modified orthogonal transmit diversity (MOTD) encoders are used for increasing space and time transmission diversity. A P-way combiner is used to connect the MOTD encoders and P multicarrier modulators. Each modulator is connected to a set of antennas. At the receiver, each multi-carrier demodulator has an amplitude/phase compensator to compensate distortion at every sub-carrier. Similarly, a combiner is used to connect the demodulators and the MOTD decoders. As a result, space, time, and frequency diversity can be explored.

6 Claims, 10 Drawing Sheets

OTHER PUBLICATIONS

Altuna, "Semi-blind equalisation for multiple-input multiple-output MC-CDMA" Second International Conference on 3G Mobile Communication Technologies, 2001. (Conf. Publ. No. 477), Mar. 26-28, 2001 pp. 387-391.*

Yung-Yi Jian et al; *Performance Analysis of MC-CDMA with Transmit Diversity for MIMO Wireless Communications*; Oct. 2003; pp. 316-318; Cross Strait Tri-Regional Radio Science and Wireless Technology Conference, 2003.

Lie-Lang Yang et al; *Space-Time Spreading Assisted Broadband MC DS-CDMA*; 2002; pp. 1881-1885; IEEE.

Lie-Lang Yang et al; *Broadband MC DS-CDMA Using Space-time and Frequency-Domain Spreading*; 2002; pp. 1632-1636; IEEE.

Bertrand Holland et al; *A Transmitter Diversity Scheme for Wideband CDMA Systems Based on Space-Time Spreading*; Jan. 2001; pp. 48-60; IEEE Journal on Selected Areas In Communications, vol. 19, No. 1.

Gang Wu et al; *Peformance Comparison of Space-Time Spreading and Space-Time Transmit Diversity* in CDMA2000; 2001; pp. 442-446; IEEE.

Jiann-An Tsai et al; *A New Orthogonal Transmit Waveform with Space-Time Diversity (OTW-STD) for Wireless CDMA Downlink Systems*; 2001; pp. 241-245; IEEE.

Jiann-An Tsai et al; *Performance of Orthogonal Transmit Waveforms for CDMA Uplink Systems in MIMO Rayleigh Channels*; 2002; pp. 206-209; IEEE.

* cited by examiner

APPARATUS OF TRANSMITTER AND RECEIVER FOR MIMO MC-CDMA SYSTEM

This application is a Division of nonprovisional application Ser. No. 10/868,804, filed Jun. 17, 2004.

BACKGROUND OF THE INVENTION

1. Field of the Invention

The present invention relates to the technical field of wireless communications and, more particularly, to a transmitter and receiver apparatus for Multiple Input/Multiple Output MultiCarrier-Code Division Multiple Access (MIMO MC-CDMA) systems.

2. Description of Related Art

A new generation cellular mobile communication system has to provide wireless network applications with high-speed information transmission. Currently, it is known that Multi-Carrier-Code Division Multiple Access (MC-CDMA) technique is one of the best solutions. CDMA is a core technique for the Third Generation Mobile Communication System, which applies Gold codes and OVSF (Orthogonal Variable Spreading Factor) codes to the system for allowing multiple users to concurrently transmit data on a same band.

Multi-carrier modulation is the principle of transmitting data by dividing a high-rate data stream into several parallel low-rate data streams onto individual carriers or subcarriers. By transmitting several symbols in parallel, the symbol duration is increased proportionately, which reduces the effects of ISI (Inter-Symbol Interference) caused by the dispersive Rayleigh-fading environment. By transmitting symbols onto subcarriers, frequency diversity is gained and thereby mitigating the effects of narrow band interference and frequency selective fading. Due to the advance of digital signal processing (DSP) and very large-scale integrated-circuit (VLSI), multi-carrier modulation is widely used in high-rate digital communications, such as digital broadcast, digital television and wireless local area network (WLAN). It is important in the present and future wireless multimedia communications.

In communication theory, multiple input/multiple output (MIMO) refers to radio links with multiple antennas at the transmitter and the receiver side. Given multiple antennas, the spatial dimension can be exploited to improve the performance of the wireless link.

In a typical MIMO MC-CDMA system, one multi-carrier modulator is connected to one transmitting antenna. That is, the transmitter has the same amount of multi-carrier modulators and transmitting antennas. The Inverse fast Fourier transform (IFFT) unit, which often occupies a large area in an Integrated Circuit(IC), is one of the most important, complicated and expensive units in a multi-carrier modulator. It means that multiple expensive IFFT units are necessary for a typical MIMO MC-CDMA system.

SUMMARY OF THE INVENTION

The object of the present invention is to provide an apparatus of transmitter and receiver for multiple input/multiple output multicarrier-code division multiple access (MIMO MC-CDMA) systems, thereby effectively improving the system performance.

According to the present invention, an apparatus of transmitter for MIMO MC-CDMA systems is provided. The apparatus of transmitter includes a modified orthogonal transmit diversity (MOTD) encoder, a combiner, at least one code spreader, at least one multi-carrier modulator and at least one set of transmitting antennas. The information used for communication is divided into at least one data stream, which is then fed into the MOTD encoder. The encoder consists of a symbol-mapping unit, a serial to parallel (S/P) converter, a splitter, and at least one code spreader in which orthogonal codes are generally applied for. Thereby the at least one spread symbol stream is obtained and connected to the combiner. At least one combined symbol stream is output from the combiner. Each of it is spread by a code spreader in which PN codes, Gold codes, or orthogonal codes are generally applied for. The at least one code spreader works as similar as the aforementioned code spreader in the MOTD encoder. The code spreader in the MOTD encoder is named as the first code spreader and the code spreader here is named as the second code spreader. Each output of the at least one second code spreader is connected to one multi-carrier modulator. In general, the modulator consists of an S/P converter, an IFFT unit, a parallel to serial (P/S) converter, and a cyclic prefix (CP) inserter. At least one set of transmitting antennas is used for radiating the RF (Radio Frequency) signal stream, which is up converted from the output of the modulator. Each radiated signal stream by an antenna in one set is delayed by small time duration.

According to the present invention, an apparatus of receiver for MIMO MC-CDMA systems is provided. The apparatus includes at least one receiving antenna, at least one multi-carrier demodulator, at least one code de-spreader, a combiner, and a MOTD decoder. Each received signal stream, which is down converted from the signal received by a receiving antenna, is connected to a multi-carrier demodulator. In general, the demodulator consists of a CP remover, an S/P converter, an FFT unit, a phase/amplitude compensator, and a P/S converter. The at least one demodulated symbol stream is combined by a combiner. The output of the combiner is connected to a code de-spreader and the output of the de-spreader is connected to a MOTD decoder. The decoder consists of at least one code de-spreader in which orthogonal codes are generally applied for, a summer, a P/S converter and a symbol-demapping unit. Finally, the information is collected from the at least one data stream which is decoded from the decoder.

Other objects, advantages, and novel features of the invention will become more apparent from the following detailed description when taken in conjunction with the accompanying drawings.

DETAILED DESCRIPTION OF THE PREFERRED EMBODIMENT

Figure 1:
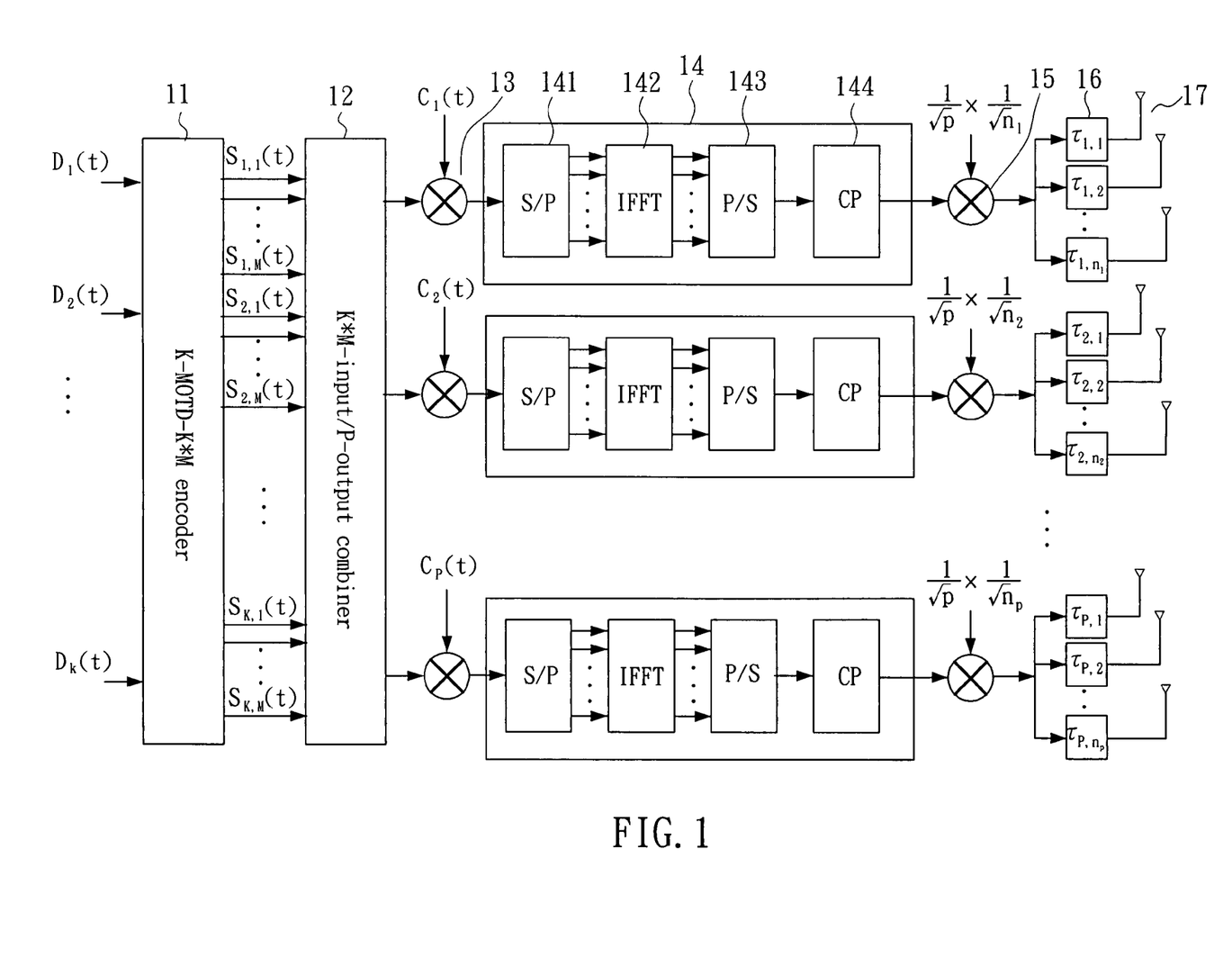
FIG. 1 is a schematic block diagram of an apparatus of transmitter for MIMO MC-CDMA systems according to an embodiment of the invention.

FIG. 1 is a schematic block diagram of an apparatus of transmitter for MIMO MC-CDMA systems according to an embodiment of the invention. In FIG. 1, the apparatus of transmitter includes a K-input/K*M-output modified orthogonal transmit diversity (MOTD) encoder (labeled by K-MOTD-K*M encoder, which means the encoder is with K inputs and K*M outputs) 11, a K*M-input/P-output combiner 12, P code spreaders 13, P multi-carrier modulators 14, P amplitude adjusters 15, a plurality of time delays 16 and a plurality of antenna sets 17, where K≧1, M≧1, and P≧1. Each multi-carrier modulator 14 consists of a serial/parallel (S/P) converter 141, an Inverse Fast Fourier Transform (IFFT) 142, a parallel/serial (P/S) converter 143 and a cyclic prefix (CP) unit 144.

Figure 2:
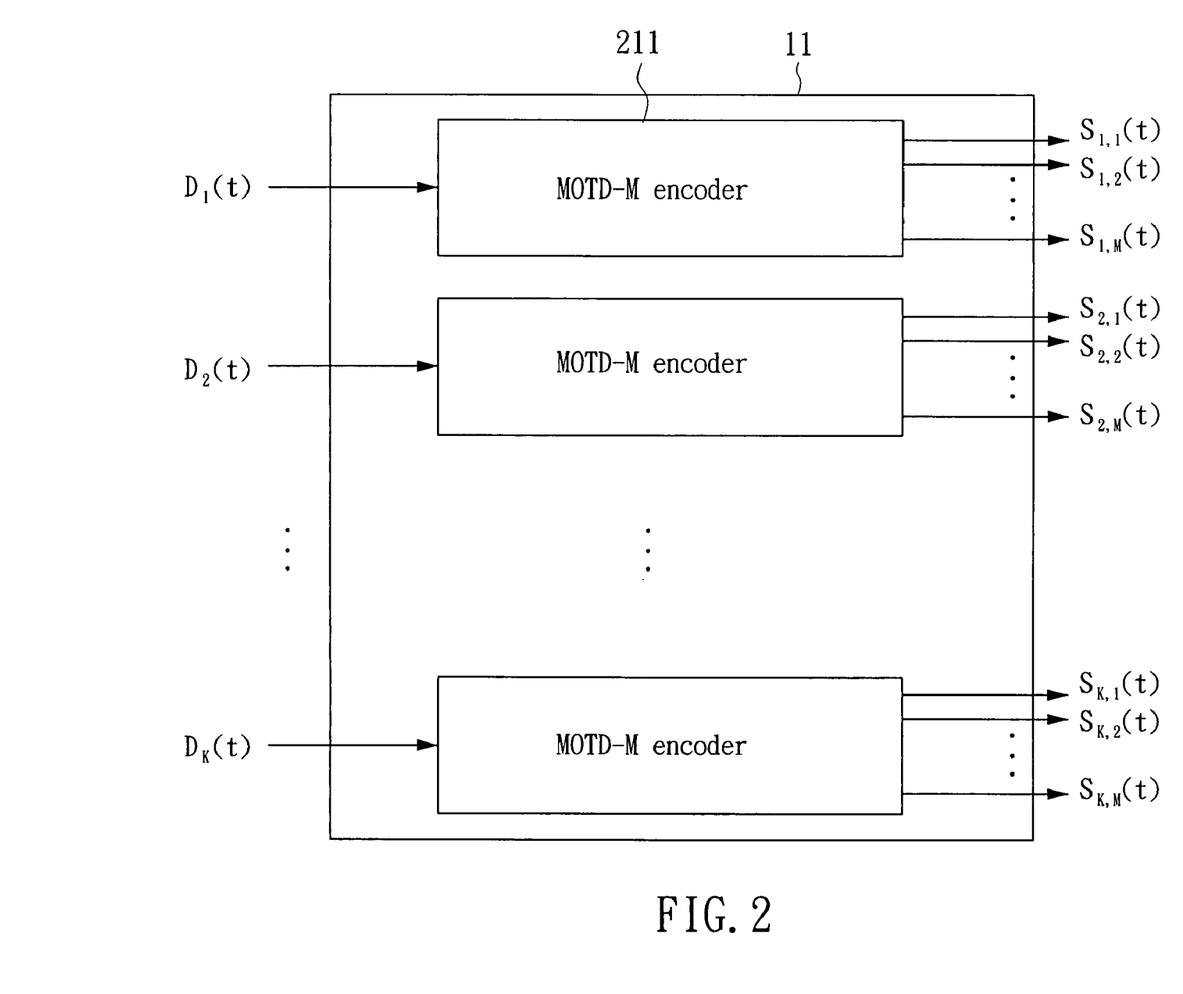
FIG. 2 is a schematic block diagram of the interior of an K-input/K*M-output MOTD encoder according to an embodiment of the invention.

FIG. 2 is a schematic block diagram of the interior of a K-MOTD-K*M encoder 11 according to an embodiment of the invention. In FIG. 2, the encoder 11 consists of K single-input/M-output MOTD encoders (MOTD-M encoder). As shown in FIG. 2, D1(t),. . .,Dk(t) can be regarded as data streams for different users or for different applications. Each data stream (such as D1(t)) passes through a MOTD-M encoder 211 to increase its transmit diversity and thus M orthogonal symbol streams (such as S1,l(t),. . .S1,M(t)) are obtained in parallel.

Figure 3:
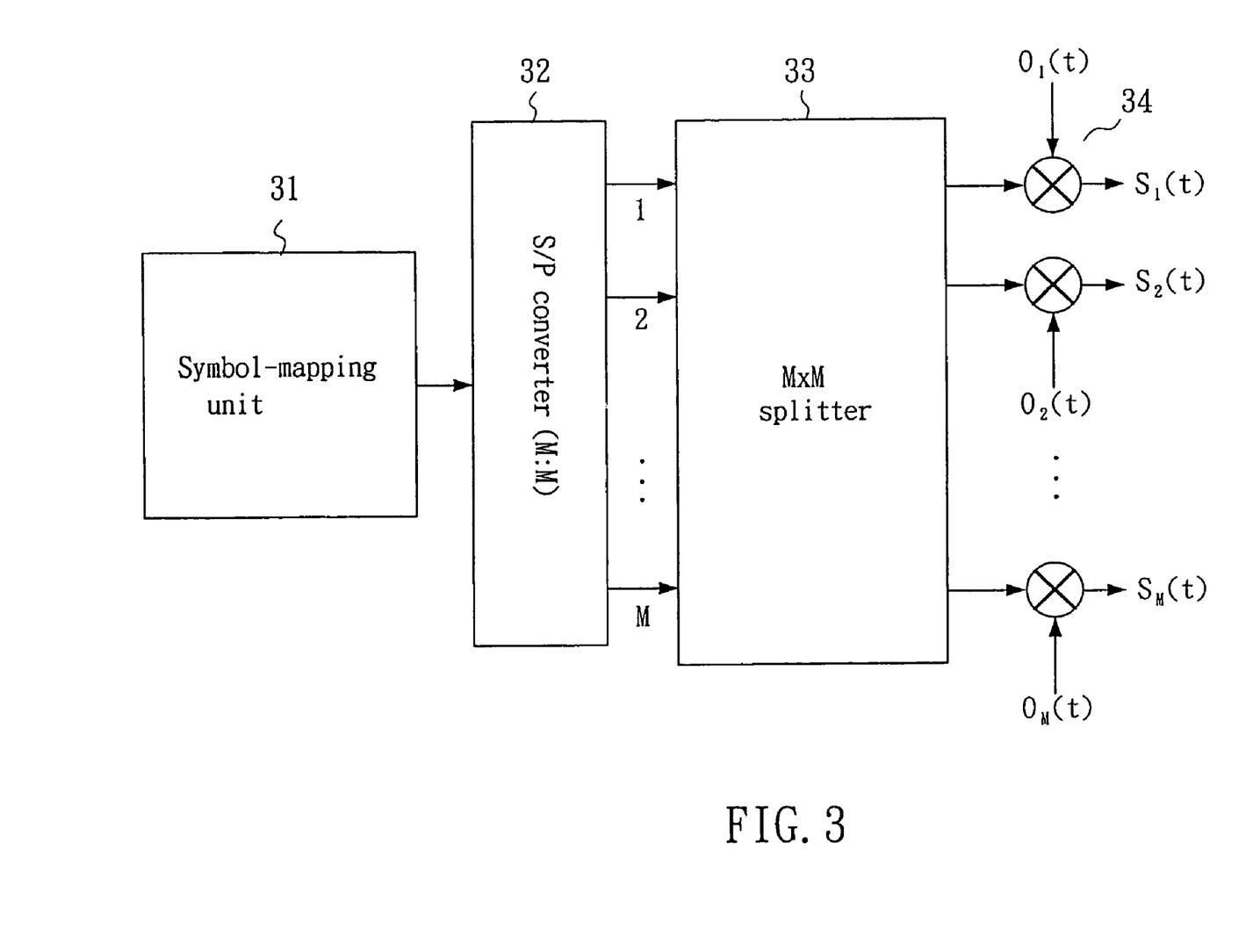
FIG. 3 is a schematic block diagram of the interior of a single-input/M-output MOTD encoder according to an embodiment of the invention.

FIG. 3 is a schematic block diagram of the MOTD-M encoder according to an embodiment of the invention. As shown in FIG. 3, the MOTD-M encoder consists of a symbol-mapping unit 31, an S/P converter 32, an M×M splitter 33 and M first code spreaders 34 in which (quasi-) orthogonal codes are generally applied for. In this embodiment, the constellation used in the symbol-mapping unit 31 can be any constellation, for example, MPSK or MQAM. The S/P converter 32 converts an M serial input symbols into M parallel output symbols. The M×M splitter 33 makes M copies of each of the M output symbols and then dispatches them in a random or a specific order (as described hereinafter). The output of the M first code spreader 34 are denoted by $S_1(t), \ldots S_M(t)$, where $O_1(t), \ldots, O_M(t)$ are generally (quasi-) orthogonal.

Figure 4:
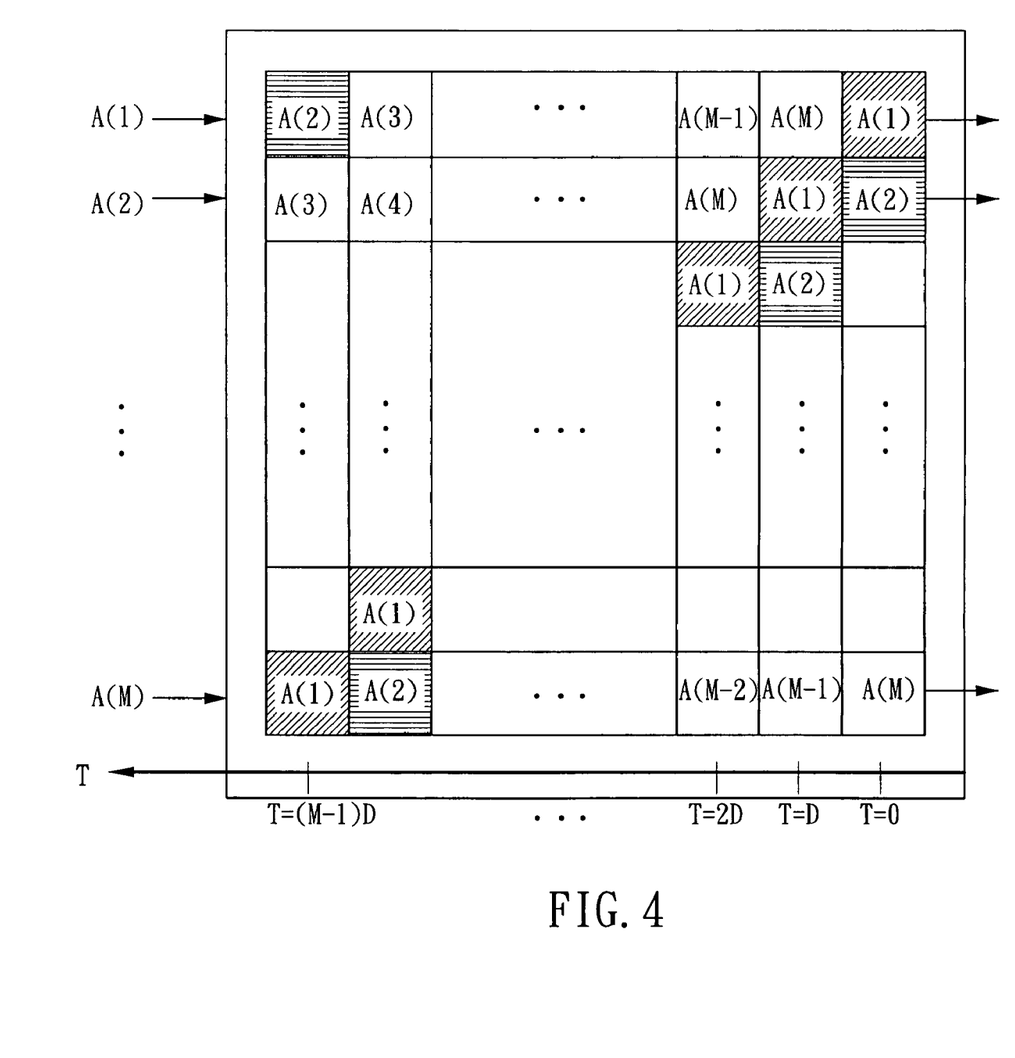
FIG. 4 is a schematic diagram of the interior of a splitter according to an embodiment of the invention.

FIG. 4 is a schematic diagram of the interior of an M×M splitter. As shown in FIG. 4, the input symbols are denoted by A(1), . . . , A(M). M copies of them will be dispatched in M time slots with a random or a specific order. FIG. 4 shows an example of a specific order. At T=0, the order from top to bottom is A(1), . . . , A(M) . At T=D, where D is a unit of time delay, the order from top to bottom is A(M), A(1), . . . ,A(M-1). Accordingly, at T=(M-1 )*D, the order from top to bottom is A(2), . . . , A(M), A(1)

Figure 5:
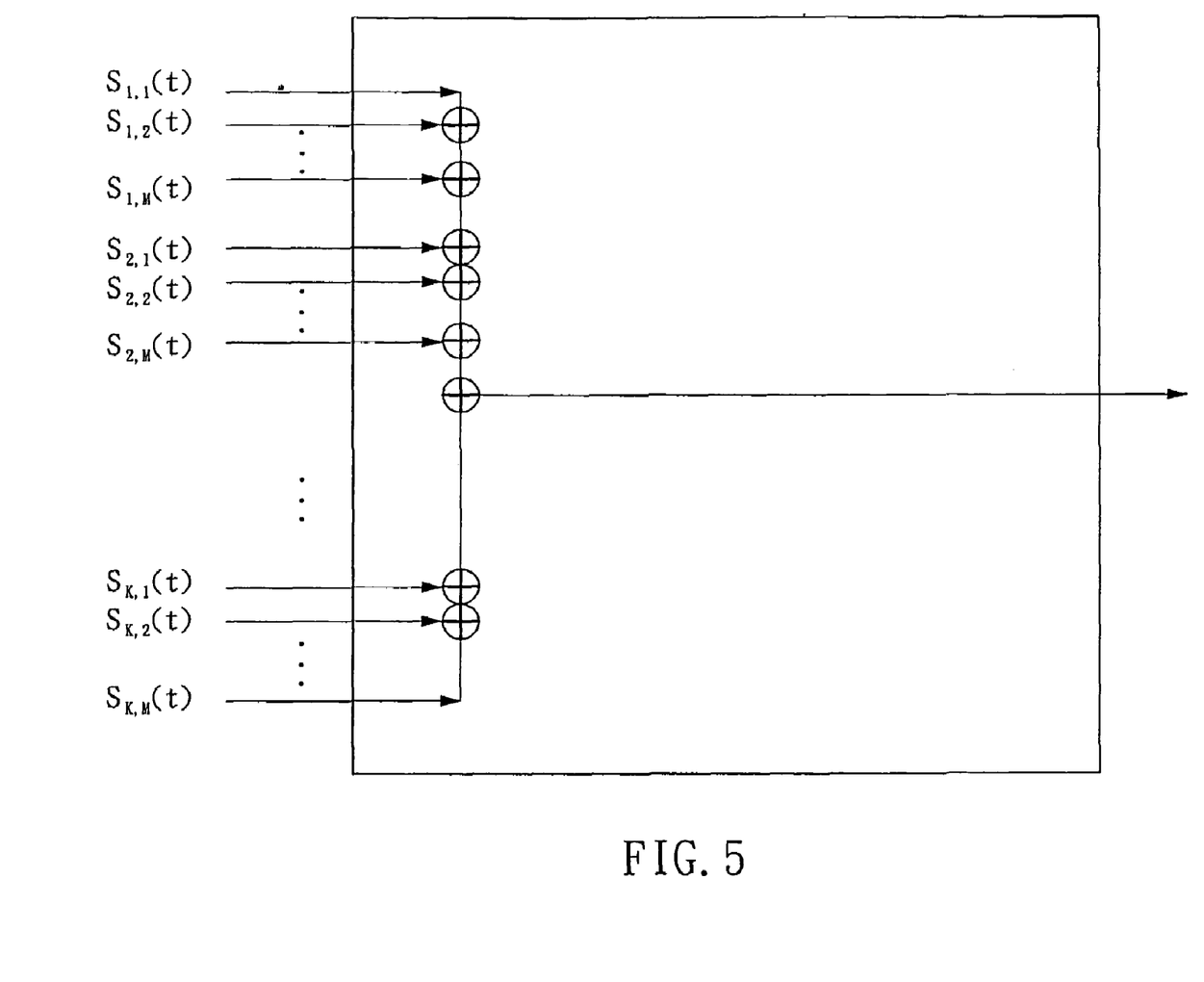
FIG. 5 is a schematic diagram of a K*M-input/P-output combiner according to an embodiment of the invention.

FIG. 5 illustrates the K*M-input/P-output combiner 12 with P=1 (i.e., a single output). The output is obtained by simply summing the K*M input symbols. With P>1 (i.e., multiple outputs), the K*M input symbols are mathematically operated and then P output symbols are generated. For example, the K*M input symbols are first divided into P groups. In each group, all the symbols then sum to its output. Note that in FIG. 1, the P second code spreaders ($C_1(t), \ldots, C_P(t)$) 13 can be the same or not. The P amplitude adjusters 15 are used for adjusting the transmission power of the antennas. FIG. 1 illustrates a case of equal transmission power to every antenna 17. The time delays 16, which values are all smaller than the CP duration, lead to an frequency selective effect in transmission. An interleaver may be inserted in front of the IFFT 142, thereby fairly treating all the symbol streams in the frequency domain.

Figure 6:
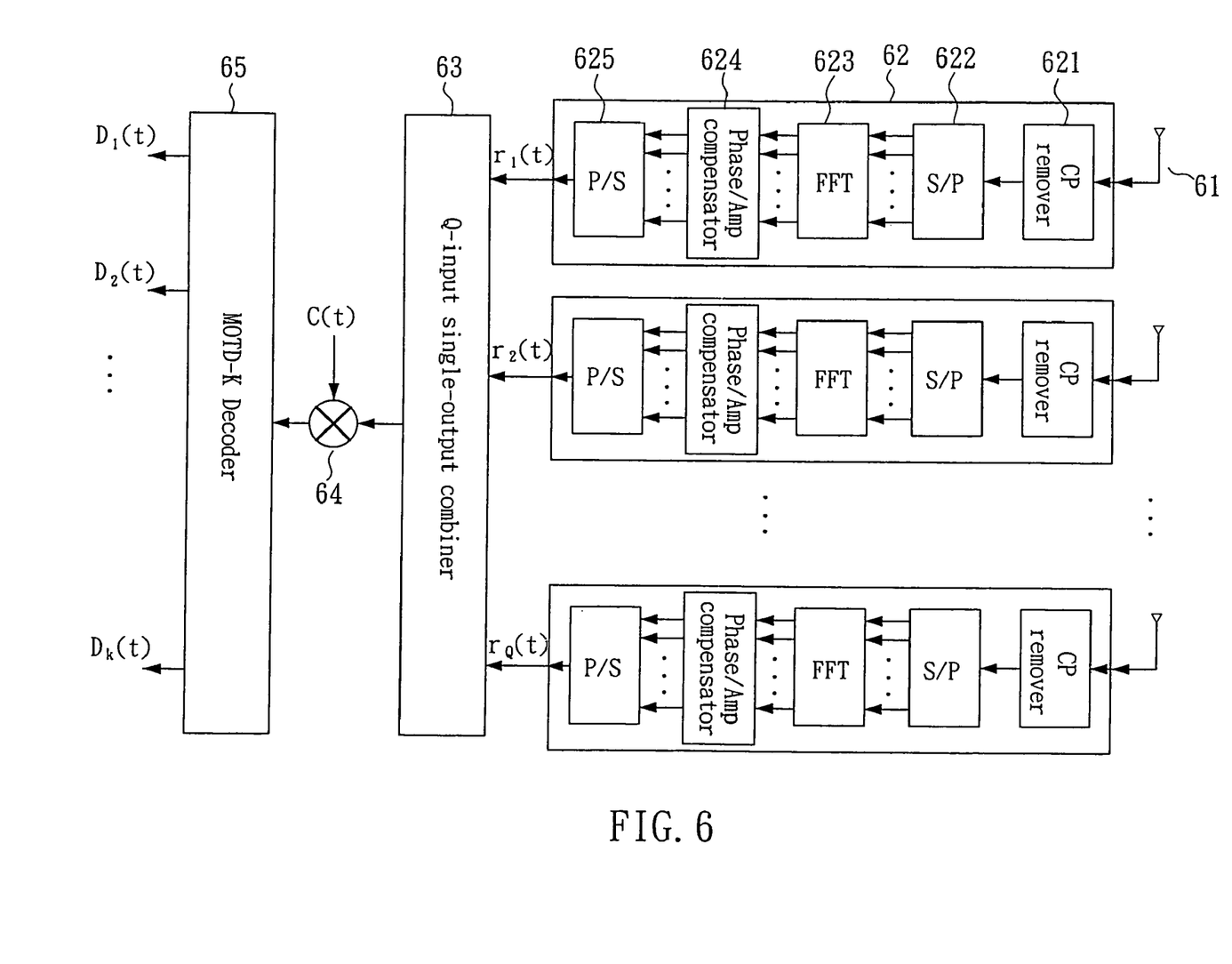
FIG. 6 a schematic block diagram of an apparatus of receiver for MIMO MC-CDMA system according to an embodiment of the invention.

FIG. 6 is a schematic block diagram of an apparatus of receiver for MIMO MC-CDMA systems according to an embodiment of the invention. In FIG. 6, the apparatus of receiver includes Q antennas 61, Q multi-carrier demodulators 62, a Q-input/single-output combiner 63, a code de-spreader 64, a single-input/K-output MOTD decoder (MOTD-K decoder) 65, where Q≧1. Each multi-carrier demodulator 62 consists of a cyclic prefix (CP) remover 621, an S/P converter 622, a Fast Fourier Transform (FFT) 623, a phase/amplitude compensator 624 and a P/S converter 625.

Figure 7:
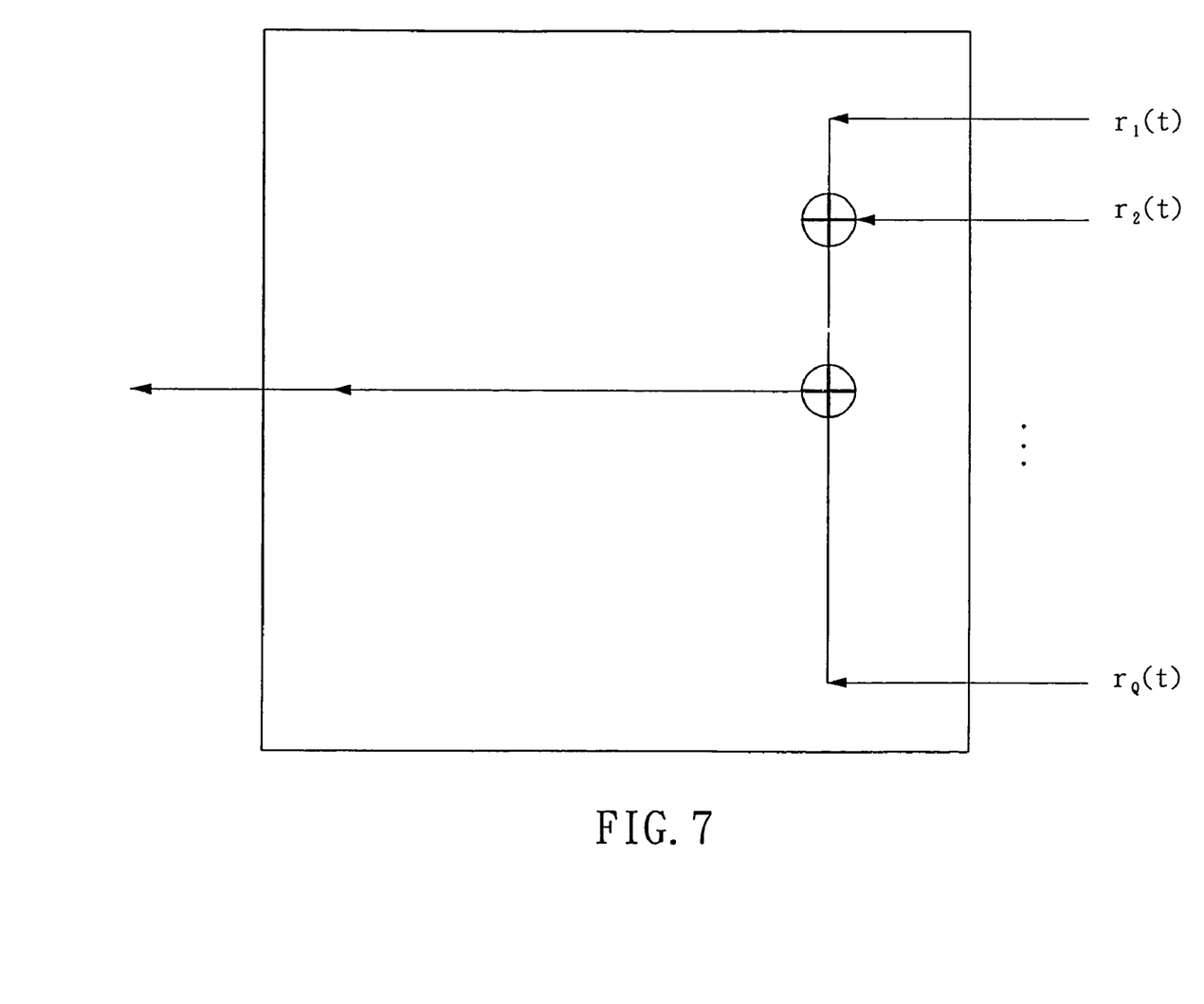
FIG. 7 is a schematic diagram of a Q-input/single-output combiner according to an embodiment of the invention.

FIG. 7 is a schematic diagram of an embodiment of a Q-input/single-output combiner 63. As shown in FIG. 7, the combiner 63 sums the Q input symbols with equal gain to output, can be thereby named as an Equal Gain Combiner (EGC). However, other combining mechanisms can also be used. For example, the Q input symbols are squared before being summed to output. In the case, the combiner can thereby named as a Maximum Ratio Combiner (MRC).

The second code de-spreader (C(t)) 64 corresponding to one of the P second code spreader 13 in FIG. 1, for example, $C(t)=C_P(t)$.

Figure 8:
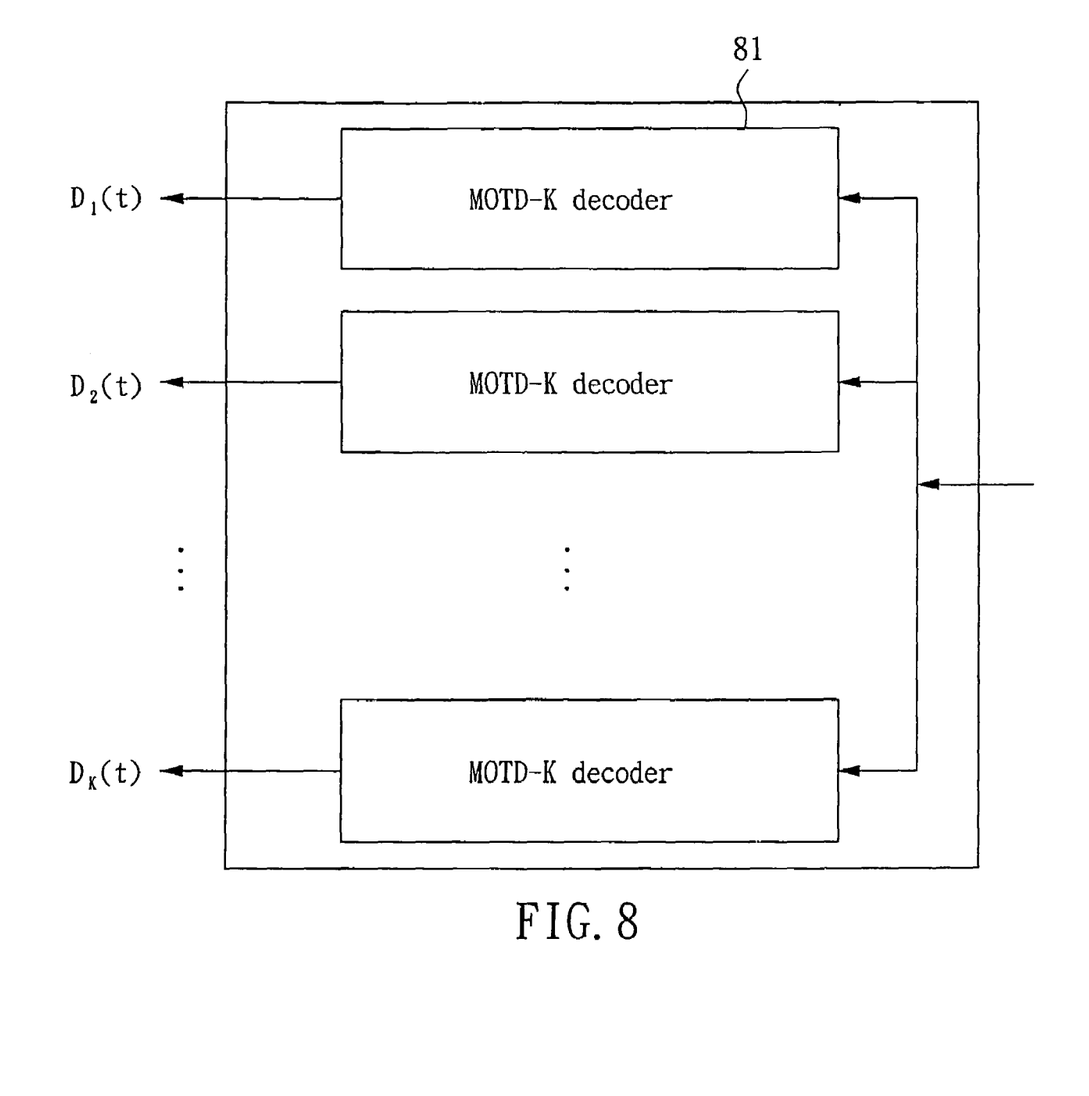
FIG. 8 is a schematic block diagram of a single-input/K-output MOTD decoder according to an embodiment of the invention.

FIG. 8 is a schematic block diagram of a MOTD-K decoder, which consists of K single-input/single-output MOTD decoders 81. As shown in FIG. 8, $D_1(t), \ldots, D_k(t)$ can be regarded as different data streams for different users or for different applications. Each stream (such as $D_1(t)$) is obtained by passing through a single-input/single-output MOTD decoder (shown in the following).

Figure 9:
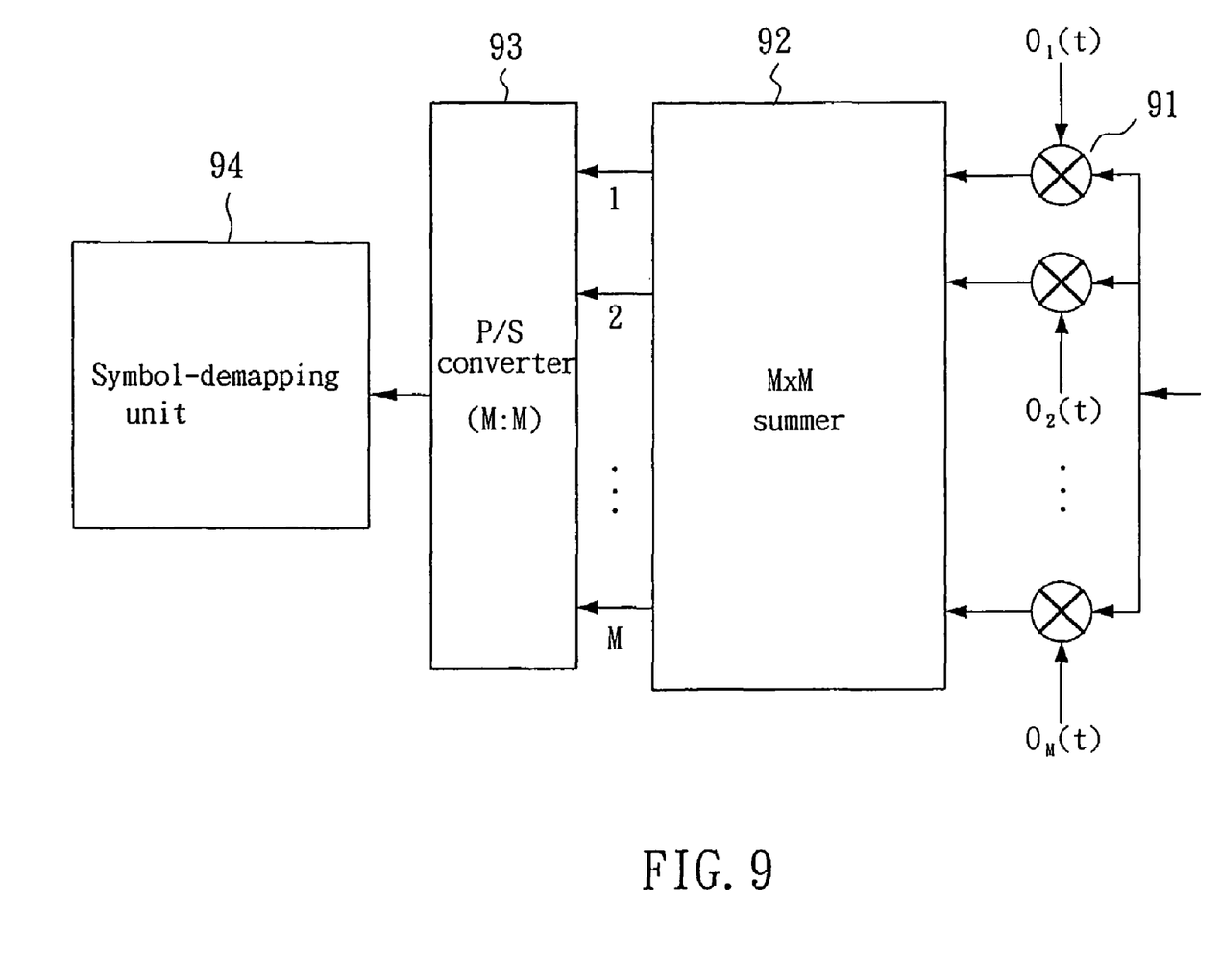
FIG. 9 is a schematic block diagram of the interior of a single-input/single-output MOTD decoder according to an embodiment of the invention.

FIG. 9 is a schematic block diagram of the interior of a single-input/single-output MOTD decoder. As shown in FIG. 9, the decoder consists of M first code de-spreader 91 in which (quasi-) orthogonal codes are generally applied for, an M×M summer 92, a P/S converter 93, and a symbol-demapping unit 94. In this embodiment, all the decoding operations are corresponding to the encoding operations in FIG. 3.

Figure 10:
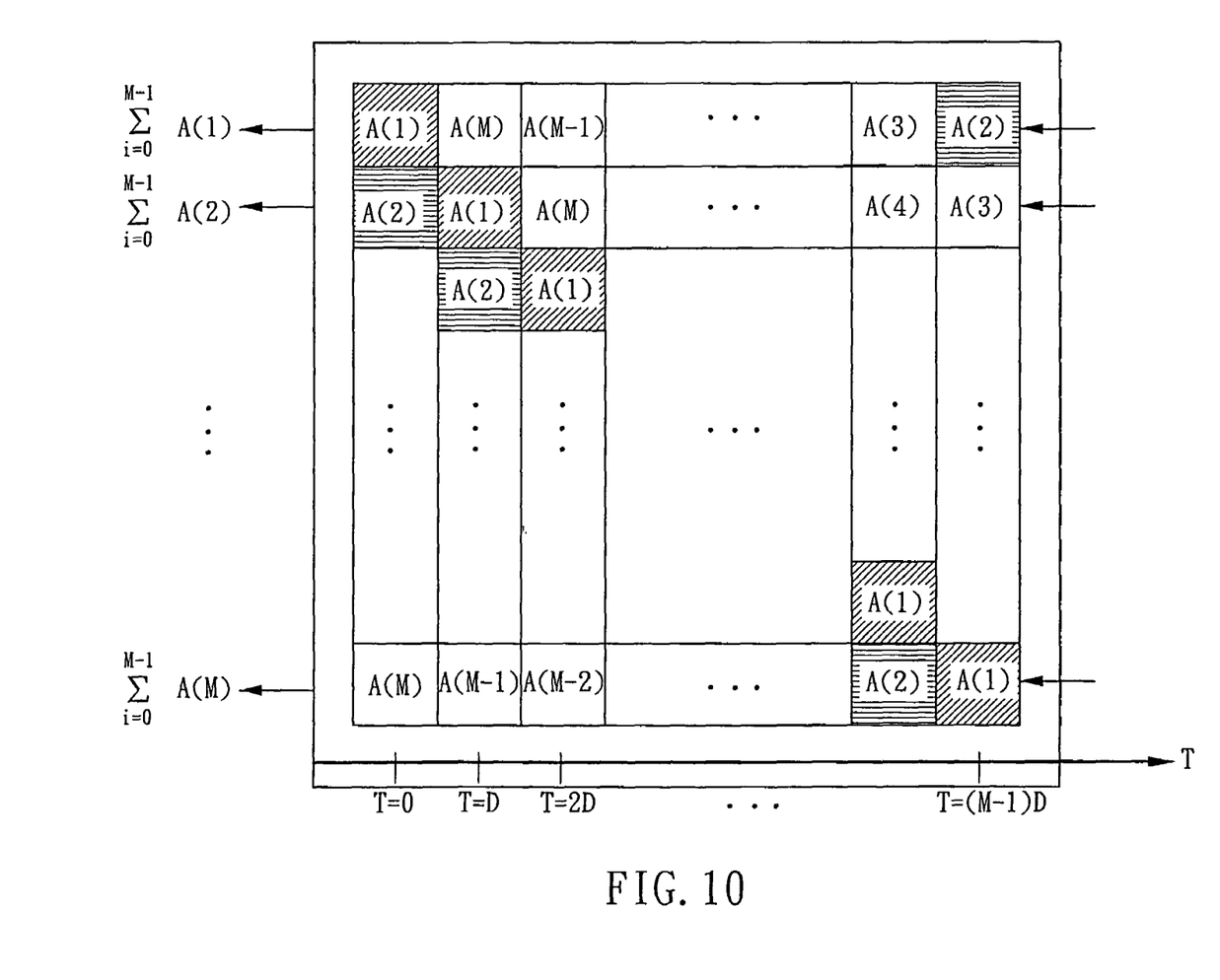
FIG. 10 is a schematic diagram of the interior of a summer according to an embodiment of the invention.

FIG. 10 is a schematic diagram of the interior of an M×M summer. Likewise, corresponding to the operations of the M×M splitter in FIG. 4, at T=0, the order from top to bottom is A(1), . . . , A(M). At T=D, where D is a unit of time delay, the order from top to bottom is A(M), A(1), . . . , A(M−1). Accordingly, at T=(M−1)*D, the order from top to bottom is A(2), . . . , A(M), A(1). If an interleaver is applied in a multi-carrier modulator, a de-interleaver (not shown) must be inserted after the FFT 623.

The invention can improve the system performance, which has proved by the simulation in a Rayleigh multi-path attenuation channel with Doppler effect.

As cited, the invention adopts the structure of orthogonal transmit branching (for example, multi- (single-) input/multi- (single-) output modified orthogonal transmit diversity (MOTD) decoders (encoders)). The invention also adopts the transceiver structure with multiple input/multiple output (MIMO), thereby effectively improving the system performance.

Although the present invention has been explained in relation to its preferred embodiment, it is to be understood that many other possible modifications and variations can be made without departing from the spirit and scope of the invention as hereinafter claimed.

What is claimed is:

1. A receiver apparatus for multiple input/multiple output multicarrier-code division multiple access (MIMO MC-CDMA) systems, comprising:
    at least one receiving antenna;
    at least one multi-carrier demodulator;
    a combiner connected to the at least one multi-carrier demodulator and that generates a symbol stream through mathematical operations as its output;
    a code de-spreader corresponding to least one code spreader in a correspondent transmitter; and
    a K-output modified orthogonal transmit diversity is an integer, $K \leqq 1$, by which at least one data stream is decoded.

2. The receiver apparatus as claimed in claim 1, wherein each multi-carrier demodulator includes a cyclic prefix remover, a S/P unit a FFT unit and a first P/S unit.

3. The receiver apparatus as claimed in claim 2, wherein the K-output MOTD decoder comprises at least one single-output MOTD decoder, each of which includes:
    at least one first code de-spreader to which any quasi-orthogonal codes are applied;
    a summing unit;
    a second P/S unit; and
    a symbol-demapping unit to obtain a data stream as its output.

4. The receiver apparatus as claimed in claim 3, wherein the at least one single output MOTD decoder includes a single input and single output.

5. The receiver apparatus as claimed in claim 2, wherein each multi-carrier demodulator further includes an amplitude/phase compensator to compensate for distortion.

6. The receiver apparatus claimed in claim 5, wherein each multi-carrier demodulator further include a de-interleaver after the FFT unit.

* * * * *